Sept. 29, 1970　　　S. G. INGRAM ET AL　　　3,531,617
PLASTIC TIP FOR SUBMERGED ARC WELDING APPARATUS
Filed Oct. 28, 1968

INVENTOR/S
SHELBY G. INGRAM &
CHARLES E. INGRAM

BY *Melville, Strasser, Foster and Hoffman*
ATTORNEYS

United States Patent Office 3,531,617
Patented Sept. 29, 1970

3,531,617
PLASTIC TIP FOR SUBMERGED ARC WELDING APPARATUS
Shelby G. Ingram and Charles E. Ingram, Middletown, Ohio, assignors to Armco Steel Corporation, Middletown, Ohio, a corporation of Ohio
Filed Oct. 28, 1968, Ser. No. 771,029
Int. Cl. B23k 9/18, 25/00
U.S. Cl. 219—73          5 Claims

ABSTRACT OF THE DISCLOSURE

A protective cap for submerged arc welding apparatus composed of an organic or inorganic polymeric material selected from the group consisting of inorganic plastics, fluoroplastics, polyimides, silicones, and allyl, polyester, epoxy, and alkyd resins, alone or in combination with filler substances.

BACKGROUND OF THE INVENTION

The recognition and confidence shown by the metal industry on welding as a means to join metals has caused a rapid growth in this field. Manually applied wire has given way to fully automatic welding procedures. Constant improvements have been sought as a means to maintain the pace of the industry by changes in materials such as the flux and welding wire, welding speeds, current requirements, etc.

The present invention relates to a pace setting improvement on the welding apparatus used in submerged arc welding applications. This procedure has been defined as a process wherein an electric arc is isolated from the atmosphere by submerging same beneath a granular-like flux material. The heat for melting and fusing the metal comes from the arc, which is struck between the workpiece and the wire electrode, while the metallic wire is fed continuously to the welding zone below the top surface of the flux.

From the above it should be evident that many contributing factors are involved in the production of a sound weld in a fast and economical manner. The quality of the base metal, welding wire, and flux are prime considerations to an effective operation. While quality control in general is desirable and essential, it should be further evident that minimum maintenance is a prerequisite to an efficient operation. It is to this latter advantage that the present invention is directed.

SUMMARY OF THE INVENTION

In a typical welding application to which this invention relates, a cylindrical contact tip is provided as the conductor and carrier for the welding wire electrode which is to be melted and fused with the base metal. An electric arc is struck between said electrode and base metal causing the melting and fusing to occur. As a result of this operation, contamination of the weld bead may develop. Further, particle adherence in the form of globules ultimately builds up on the wire opening in the lower end of the contact tip causing inefficient operation and eventually failure.

These problems are eliminated by providing a plastic cap for the submerged end of the contact tip. In the preferred structure, the protective cap is made of polytetrafluoroethylene resin, a material commercially produced under the DuPont trademark "Teflon."

It has been found that with such an addition to the apparatus, the life of the welding tip is prolonged. Additionally, it is possible to maintain the continuity of the weld by a more constant voltage at the arc. Finally, with the protective cap as described above, an A.P.I. (American Petroleum Institute) quality weld has been maintained—a fact virtually impossible before.

DETAILED DESCRIPTION OF THE PREFERRED EMBODIMENT

Figure 1:
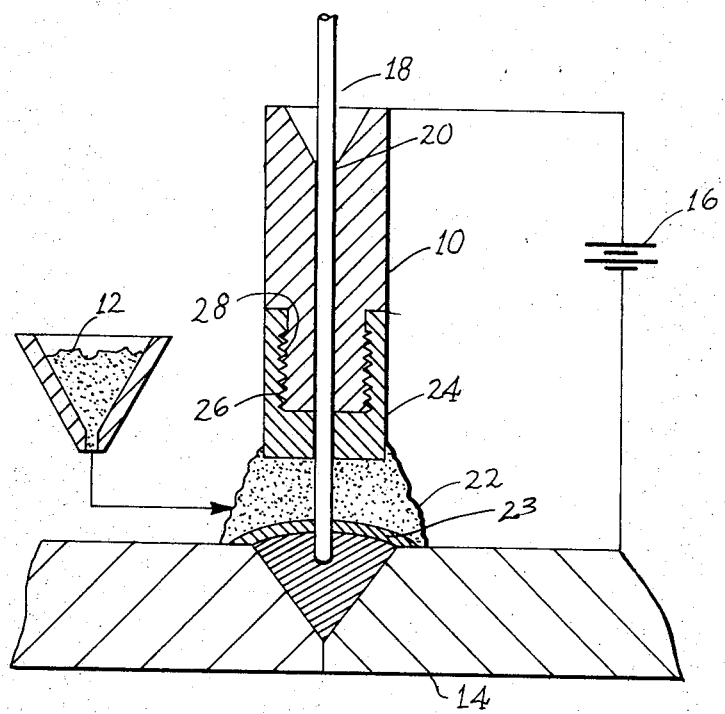
FIG. 1 is a schematic representation showing a typical submerged arc welding operation, but with the novel protective cap of this invention.

Turning now to a consideration of FIG. 1, which illustrates the operation, it will be observed that the standard components for the apparatus include a cylindrical contact tip 10 and a flux supply 12. Situated below these respective components is the workpiece 14. In order to secure the arc for melting and fusing purposes, an electrical power source 16 is provided between the contact tip 10, the wire electrode 18, and the workpiece 14.

In operation, the solid electrode wire 18 is fed continuously through the bore 20 of contact tip 10 by some suitable means to the submerged arc. Electrical current reaches the wire where the wire makes intermittent contact with the tip along the bore 20. The heat from the arc melts the wire 18, flux 22 from the supply 12, and the workpiece 14 to form a common pool. The fluxes generally employed here are ones which have a scavenging-deoxidizing effect on the molten metal. Also, the flux being lighter than the metal, it has an insulating effect on the molten metal; that is, it provides a blanket protection as molten slag 23 against contamination from the atmosphere. Unfortunately, this insulating shield cannot adequately protect against contamination by the contact tip, which is generally made of copper and susceptible to wear and erosion.

Another problem encountered in operation is the interference with the arc caused by the deposition of globules of metal particles on the contact tip. This affects the continuity of the wire feed and the stability of the arc, hence, its effectiveness to melt and fuse the metal.

The present invention offers a way to avoid these problems by the use of a unique protective cap 24 at the arc end of contact tip 10.

Figure 2:
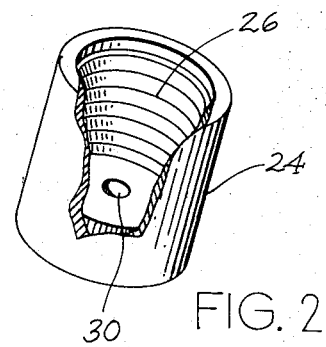
FIGS. 2 and 3 are upper and lower perspective views of one embodiment of the protective cap of this invention.
Figure 3:
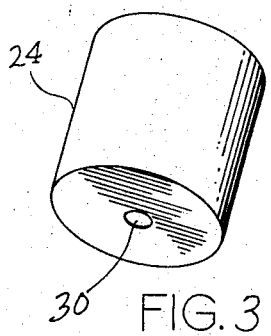

FIGS. 2 and 3 are two different perspective views of the cap 24 shown in FIG. 1. While the preferred embodiment shows the cap to be threadably engaged with the electrode, it should be understood that other suitable fastening means may be employed. However, for convenience, the further description will be limited to the preferred embodiment. Thus, the following should not be read as a limitation on this invention.

It will be observed in FIG. 2 that part of the side of the cap 24 has been removed to reveal the internal threading 26. By suitably designing the contact tip 10 with mating threads 28, it is possible to secure the cap 24 in an operative position. By this arrangement, rapid changes may be made in the apparatus without undue delay in the operation. Finally, in the preferred embodiment, an axial bore 30 is provided in the cap 24 so that the bare wire 18 may be fed to the melting zone.

In a comparison run of welding with and without the protective cap, it was found that copper contact tips lasted approximately 16 hours before replacement was necessary. Here, weld globules plugged the feed hole. When a protective cap made of Teflon (a fluoroplastic polytetrafluoroethylene resin) was added to the end of the contact tip, its life was extended at least five-fold, i.e., 80–150 hours. Replacement in this latter case was not made as a result of damage to the cap, but because the feed hole became distorted and oversized causing poor contact with the wire electrode.

With the performance such as described above, high speed production of A.P.I. quality welds became a reality. This strict standard permits only a minimum of repair welds in a given length of pipe. Heretofore, frequent shutdowns due to poor contact or replacement of the contact tip made it practically impossible to meet the A.P.I. standard.

While the preferred material for the protective cap 24 is the high temperature-resistant Teflon, it is contemplated that other materials may be suitable. Such materials may be from the family of fluoroplastics, polyimides, silicones, and allyl, polyester, epoxy and alkyd resins, alone or in combination with filler substances. For example, additives like glass and synthetic fibers will improve the overall heat resistant properties of the cap as well as its strength.

Since the preceding is merely illustrative of the preferred embodiment of this invention, and since numerous modifications may become apparent to those skilled in the art, no limitation is intended to be imposed herein except as set forth in the appended claims.

The embodiments of the invention in which an exclusive property or privilege is claimed are defined as follows:

1. In apparatus for joining metals through the formation of a weld bead by means of the submerged arc welding practice, including a contact tip having a central bore for receiving the continuous feed of an electrode wire therethrough, means for constantly feeding said electrode wire to said contact tip, means for supplying a quantity of granular flux to the weld zone under said contact tip, and means for striking an arc between said electrode wire and said metals to be welded, the improvement comprising in combination therewith the provision of a plastic cap enclosing the lower end of said contact tip with at least the lowermost portion thereof submerged in said flux, said cap having an opening aligned with and substantially equal to said bore for feeding said electrode wire to said metals to be welded, said electrode wire projecting through said opening into said flux, whereby the continuity of feeding said electrode wire is assured by preventing the deposition of globules of metal particles on said contact tip.

2. The apparatus claimed in claim 1 wherein said cap comprises a material selected from the group consisting of inorganic plastics, fluoroplastics, polyimides, silicones, and allyl, polyester, epoxy and alkyd resins.

3. The apparatus claimed in claim 2 wherein said material is combined with a filler substance.

4. The apparatus claimed in claim 2 wherein said material is high temperature-resistant polytetrafluoroethylene.

5. The apparatus claimed in claim 2 wherein said cap is provided with means for mating with said contact tip.

References Cited

UNITED STATES PATENTS

| | | | |
|---|---|---|---|
| 2,379,470 | 7/1945 | Baird | 219—136 |
| 2,549,804 | 4/1951 | Graham | 219—136 |
| 2,721,249 | 10/1955 | Landis et. al. | 219—130 |
| 2,827,550 | 3/1958 | Unrath | 219—130 |
| 2,928,933 | 3/1960 | Andriola | 219—74 |
| 2,981,824 | 4/1961 | Kitrell | 219—74 |
| 3,004,872 | 10/1961 | Stark | 219—146 |
| 3,221,136 | 11/1965 | Freeth et al. | 219—74 |
| 3,239,648 | 3/1966 | Syrigos | 219—130 |
| 3,370,152 | 2/1968 | Rolnick | 219—146 |

WILLIAM D. BROOKS, Primary Examiner

U.S. Cl. X.R.

219—130